United States Patent [19]

Ritter et al.

[11] Patent Number: 5,724,816
[45] Date of Patent: Mar. 10, 1998

[54] COMBUSTOR FOR A GAS TURBINE WITH COOLING STRUCTURE

[75] Inventors: Ann Melinda Ritter, Albany; Robert Patrick Campbell, Loudonville; Melvin Robert Jackson, Niskayuna; Ross Anthony McLean, Ballston Spa; Mitchell Reuben Cohen, Troy; Nesim Abuaf, Schenectady; Sanjay Marc Correa, Niskayuna; Lance Gordon Peterson, Ballston Spa; Myron Clyde Muth, West Charlton; Adrian Maurice Beltran, Ballston Spa; Constantinos Minas, Slingerlands; David Robert Schumacher, Scotia; Jeffrey Alan Graves, Niskayuna, all of N.Y.

[73] Assignee: General Electric Company, Schenectady, N.Y.

[21] Appl. No.: 627,807

[22] Filed: Apr. 10, 1996

[51] Int. Cl.⁶ ............................................. F02C 1/00
[52] U.S. Cl. ............................................. 60/752
[58] Field of Search ........................... 60/752, 758, 759, 60/760; 431/353

[56] References Cited

U.S. PATENT DOCUMENTS

| | | | |
|---|---|---|---|
| 3,398,527 | 8/1968 | Taylor et al. | 60/752 |
| 4,607,487 | 8/1986 | Tilston | 60/752 |
| 5,363,654 | 11/1994 | Lee | 60/752 |

*Primary Examiner*—Charles G. Freay
*Attorney, Agent, or Firm*—Ernest G. Cusick; William H. Pittman

[57] ABSTRACT

A combustor/transition piece for a gas turbine including a double walled structure having a plurality of cooling channels, both axially and, in some cases, circumferential cross-flow passages positioned between the structure's inner member and the outer member to provide cooling air thereto, are formed in the area between the inner member of the combustor and the outer member thereof. The passages preferably extend both axially and circumferentially with respect to the direction of flow through the combustor/transition piece. The axial passages extend completely from one end to the other and the circumferential passages extend around the circumference of the combustor/transition piece. The addition of a circumferential cross-flow passage connecting axial flow coolant passages in double wall turbine components can prevent combustor/transition piece part failure due to axial passage inlet blockage without affecting normal, unblocked cooling. Double wall cooling structures are constructed using two unbonded members. The inner member is machined to form cooling passages. Differential thermal expansion (expansion of the outside diameter of the hot inner wall until contact is established with the inside diameter of the cooler outer wall) keeps the cylinders held tightly together. Double wall cooling structures are also constructed using two members shrink-fitted and then bonded together such as by welding. The inner member is machined to form the cooling passages. The improved thermal contact between the outer and inner members due to the joint reduces the thermally induced stresses in the two members.

22 Claims, 6 Drawing Sheets

COMBUSTOR FOR A GAS TURBINE WITH COOLING STRUCTURE

RELATED APPLICATIONS

This application is related to commonly assigned U.S. patent application Ser. No. 08/669,070 (RD-23,667), filed Jun. 29, 1996, of Jackson et al. and U.S. patent application Ser. No. 08/669,069 (RD-23,635), filed Jun. 29, 1996, of Jackson et al., the disclosure of each is herein incorporated by reference.

BACKGROUND OF THE INVENTION

This invention relates generally to gas turbine combustors and more particularly relates to improved combustors and/or transition pieces for utilization where film cooling may be extremely limited or might not even be possible.

Traditional gas turbine combustors use diffusion (i.e., nonpremixed) flames in which fuel and air enter the combustion chamber separately. The process of mixing and burning produces flame temperatures exceeding 3900 degrees F. Since the maximum temperature conventional combustors and/or transition pieces having liners are generally capable of withstanding is on the order of about 1500 degrees F., steps to protect the combustors and/or transition pieces liners must be taken. This has typically been done by film-cooling which involves introducing the relatively cool compressor air into a plenum surrounding the outside of the combustor. In this prior arrangement, the air from the plenum passes through louvers in the combustor liner and then passes as a film over the inner surface of the combustor liner, thereby maintaining combustor liner integrity.

Because diatomic nitrogen rapidly disassociates at temperatures exceeding about 3000° F. (about 1650° C.), the high temperatures of diffusion combustion result in relatively large $NO_x$ emissions. One approach to reducing $NO_x$ emissions has been to premix the maximum possible amount of compressor air with fuel. The resulting lean premixed combustion produces cooler flame temperatures and thus lower $NO_x$ emissions. Although lean premixed combustion is cooler than diffusion combustion, the flame temperature is still too hot for prior conventional combustor liners to withstand.

Furthermore, because the advanced combustors premix the maximum possible amount of air with the fuel for $NO_x$ reduction, little or no cooling air is available making film-cooling of the combustor liner impossible. Thus, means such as thermal barrier coating in conjunction with "backside" cooling have been considered to protect the combustor liner from destruction by such high heat. Backside cooling involved passing the compressor air over the outer surface of the combustor liner prior to premixing the air with the fuel.

Lean premixed combustion reduces $NO_x$ emissions by producing lower flame temperatures. However, the lower temperatures, particularly along the inner surface or wall of the combustor liner, tend to quench oxidation of carbon monoxide and unburned hydrocarbons and lead to unacceptable emissions of these species. To oxidize carbon monoxide and unburned hydrocarbons, a liner would require a thermal barrier coating of extreme thickness (50–100 mils) so that the surface temperature could be high enough to ensure complete burnout of carbon monoxide and unburned hydrocarbons. This would be approximately 1800–2000 degrees F. for combustors of typical lengths and flow conditions. However, such thicknesses and temperatures are beyond materials capabilities. Known thermal barrier coatings degrade in unacceptably short times at these temperatures and such thick coatings are susceptible to spallation.

Accordingly, there is a need for a combustor/transition piece which can withstand combustion temperatures without film-cooling and yet maintain flame stability and burn out carbon monoxide and unburned hydrocarbons, such as advanced cooling concepts for low-emissions-combustors and transition pieces (particularly $NO_x$ emissions). Such combustor/transition pieces should provide cooling channels in thin-walled structures which allow the inner surface of the combustor/transition piece to maintain reasonable metal temperatures. Efficient cooling combustor/transition piece structures should provide cooling flow reduction of about 35 to about 60% without increasing the metal temperature of the inner surface of the combustor. Such structures should use small hydraulic diameter axial flow cooling passages which may be prone to inlet blockage by foreign objects in the cooling air flow. If a passage becomes blocked, normally no coolant would flow through the passage and the combustor or transition piece might fail due to the resulting high wall temperatures and temperature gradients. Therefore, such combustors should have means for accommodating such blocked passages without the combustor/transition piece failing.

SUMMARY OF THE INVENTION

The above-mentioned needs are met by the present invention which provides an improved gas turbine combustor/transition piece. The combustor/transition piece includes a double walled structure having a plurality of cooling channels, both axially and, in some cases, circumferential cross-flow passages positioned between the structure's inner member and the outer member to provide cooling air thereto, which are formed in the area between the inner member of the combustor and the outer member thereof. The passages preferably extend both axially and circumferentially with respect to the direction of flow through the combustor/transition piece. The axial passages extend completely from one end to the other and the circumferential passages extend around the circumference of the combustor/transition piece.

Combustors, transition pieces and other turbine structures, such as but not limited to, for example, nozzles, buckets, vanes, blades, and other such components for which film cooling may be extremely limited or may not be an option, can be produced with double-walled cooling channels by metalworking of preconsolidated assemblies which will allow effective use of convective and/or impingement cooling techniques. Cylindrical and conical rings, or more complex-geometry transition pieces with complex internal cooling channels running circumferentially can be produced by hot-rolling of a HIP preform, followed by cold ring-rolling, welding, and chemical removal of sacrificial materials used to maintain the cooling channel locations during metal deformation.

The addition of a circumferential cross-flow passage connecting axial flow coolant passages in double wall turbine components can prevent combustor/transition piece part failure due to axial passage inlet blockage without affecting normal, unblocked cooling.

Double wall cooling structures can also be constructed using two unbonded members. The inner member is machined to form cooling passages. Differential thermal expansion (expansion of the outside diameter of the hot inner wall until contact is established with the inside diameter of the cooler outer wall) keeps the cylinders held tightly together. While the cooling passsages can also be machined in the cold walls with no passages in the hot wall, it is preferred to the cooling passages in the hot wall because the surface area for heat transfer is greater.

Double wall cooling structures can also be constructed using two members shrink-fitted and then bonded together by a joining process such as, for example, welding. The inner member is machined to form the cooling passages. The improved thermal contact between the outer and inner members due to the joint reduces the thermally induced stresses in the two members.

Other objects and advantages of the present invention will become apparent from the following description, the accompanying drawings and the appended claims.

DETAILED DESCRIPTION OF THE INVENTION

Figure 1:
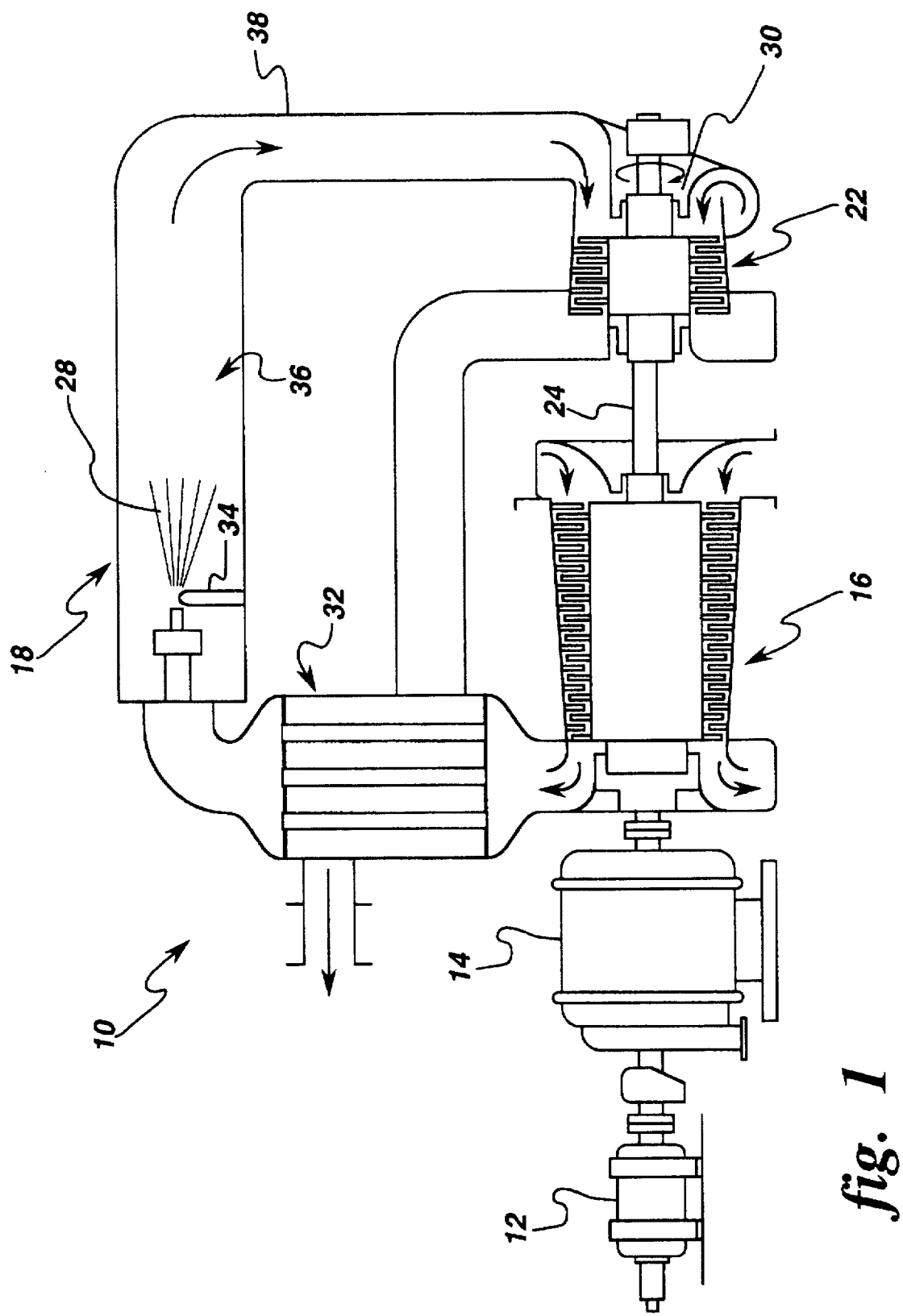
FIG. 1 is a schematic representation of a representative gas turbine.

FIG. 1 schematically illustrates a gas turbine system 10. In operation, typical gas turbines 10 are driven by the combustion gases from liquid fuels, in that a flowing medium with a high energy content, i.e., the combustion gases, produces a rotary motion as a result of being deflected by rings of blading mounted on a rotor. In operation, the compressor 16 draws in fresh air and compresses it to a pressure of about 50–75 lb/in$^2$; the air is forced by the compressor 16 through a heat exchanger 32 where it is preheated by the heat that is still present in the exhaust combustion gases emerging from the turbine section 22; and finally, the preheated air is admitted into the combustion chamber of the combustion section 18. In the combustion chamber, fuel is burned, thereby producing gases with a temperature greater than about 1500° C. or about 27500° F. These combustion gases flow at a high velocity into turbine section 22 and drive it.

As shown, the turbine 22 itself, the compressor 16 and the electric generator 14 are all mounted on a single shaft 24. As is well known, the turbine cannot transmit its entire power output to the generator, for a substantial portion is needed for driving the compressor 16. The turbine section 22 is started with the aid of the electric motor 12 which first has to set the compressor in motion in order to produce compressed air and supply it to the combustion chamber so as to enable the combustion gases to be formed. Only then can the turbine start running.

As schematically shown in FIG. 1, the combustion section 18, which includes the combustion chamber 36 provides for the flow of the combustion gas 28 from the combustion section 18 to the turbine inlet 30. A transition piece 38 connects the turbine inlet and the combustion section 18.

In the construction of combustors or combustor sections and transition pieces, where the temperature of the combustion gases is about or exceeds about 1500° C., there are no known materials which can survive such a high intensity heat environment without some form of cooling. As was stated above, in situations where film cooling is not possible or not a viable option, combustors and transition pieces have been fabricated having axial cooling channel and using two unbonded members.

Figure 2:
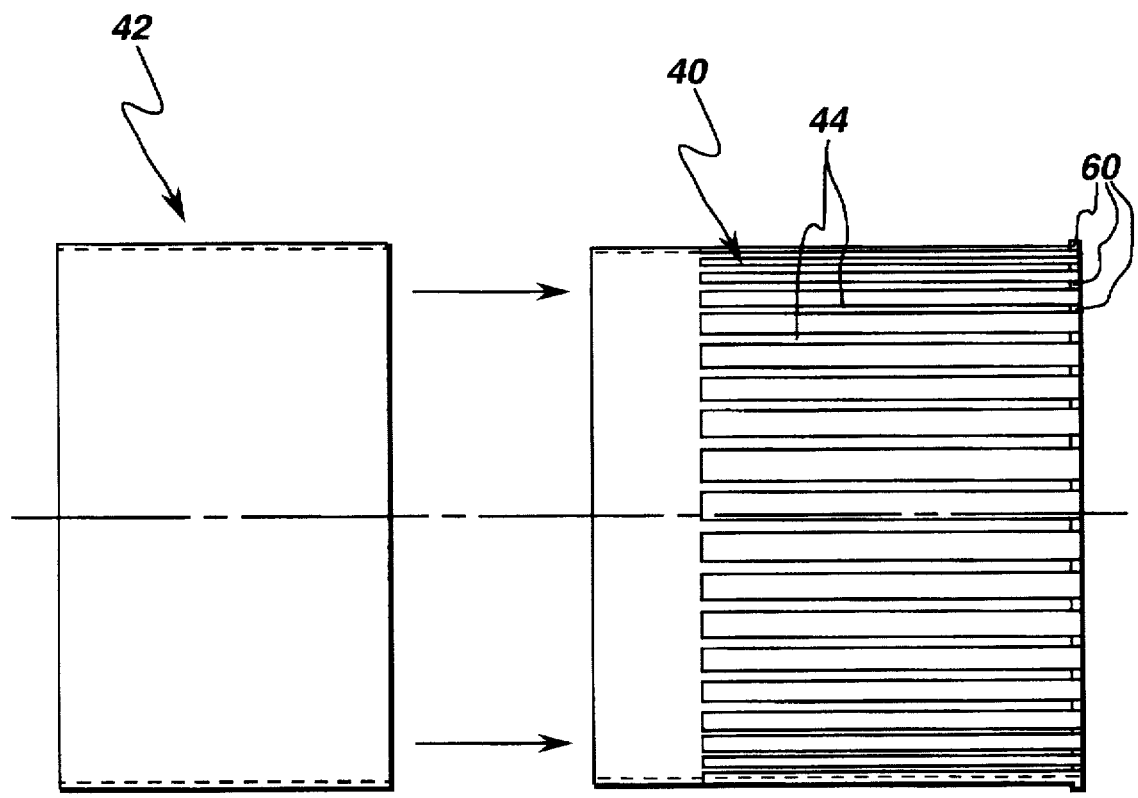
FIG. 2 is a perspective view of an embodiment of the inner portion of a double walled structure constructed from two ring-rolled and welded cylinders including an inner cylinder having cooling passages machined in the outer surface thereof.
Figure 3:
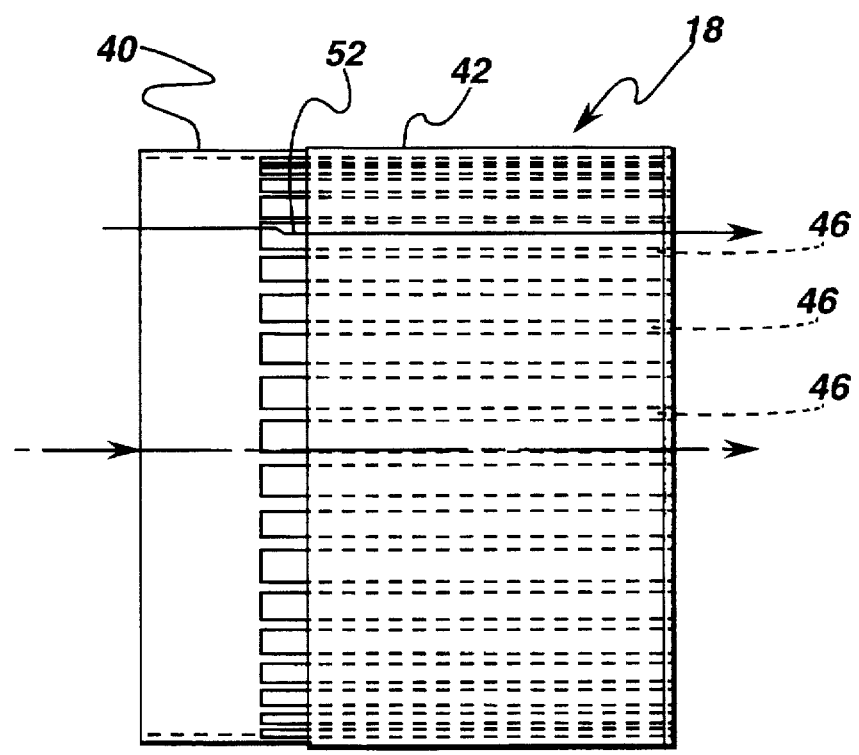
FIG. 3 is a view of the doubled walled structure of FIG. 5 where the outer cylinder is shrink-fitted over the machined inner cylinder, forming the cooling passages.
Figure 4:
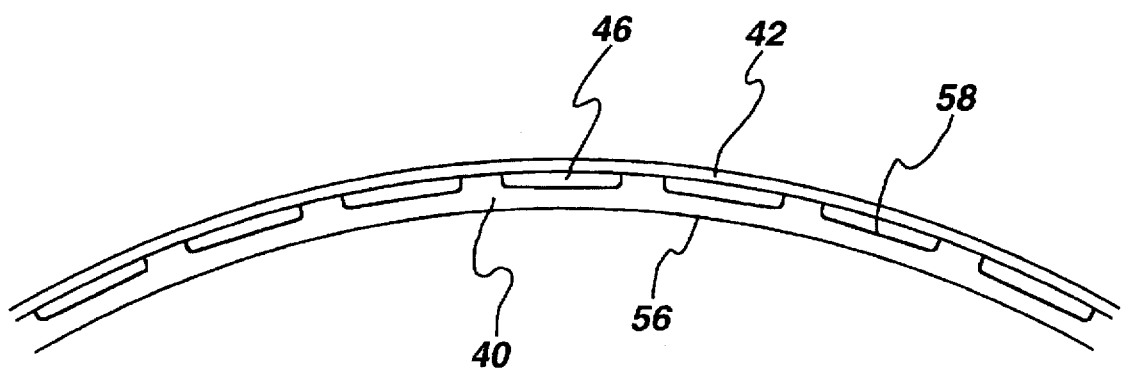
FIG. 4 is a partial cross-section of a double wall structure, showing the passages formed by the machined inner ring and the shrink-fitted outer ring.

Each member 40, 42 may be produced by ring-rolling wrought sheet-stock to the desired diameter, and then joining the member at the gap by a welding method, such as Gas Tungsten Arc (GTA) welding or Electron-beam (E-beam) welding. The members 40, 42 are sized to the correct final diameter. Slots 44 to form cooling passages are machined in the outer surface of the inner member 40. The inner 40 and outer member 42 are shown in FIG. 2 before assembly. The outer member 42 is then shrink-fitted onto the inner member 40, forming the cooling passages 46 (FIG. 3). The geometry of the resulting double-walled cooling structure is shown in more detail in FIG. 4. The cooling geometry is not restricted to the simple axial passages 46 shown because it is believed that more complicated enhanced cooling geometries can be formed such as, by machining, on the inner member 40 wall. For example, circumferential cross-flow passages (see FIG. 7) can be included in the forming step.

The outer member 42 in this example is positioned such that the entrance 52 to the cooling passages 46 is exposed to the cooling air, which flows through the passages 46 and cools the hot inner wall 56. During operation of the combustor, the hot combustion gases flowing through the inner portion of the combustor 18 will keep the inner member 40 hotter than the outer member 42. Because of this, differential thermal expansion will hold the members 40, 42 tightly together.

In order to maintain the position of the outer member 42 during cool-down, means, such as mechanical stops 60 (see FIG. 2) can be machined on the aft end of the inner member 40 to stop the outer member 42 from sliding. These stops may be important, if the combustor is over-temperatured and plastically deforms and distorts (either the hot wall 56 or the cold wall 58), resulting in a subsequent non-uniform fit of the outer 42 and inner member 40.

EXAMPLE 1

The above described concept was reduced to practice by production of full scale double-walled combustor segments approximately seven (7) inches in length and approximately fourteen (14) inches in diameter, joined to an actual can combustor and transition piece. The first iteration was made from Hastelloy-X and used cooling passages that were about 0.30 inches wide, about 0.030 inches deep and about 6.5 inches long, separated by ribs about 0.20 inches thick, for a total of 88 passages 46 in the fourteen (14) inch diameter combustor. The inner member 40 had a minimum wall thickness of about 0.063 inches underneath the cooling passages, while the outer member 42 wall was about 0.06 inches thick. With coolant supplied at about 725° F. at a pressure of about 217 PSIA (absolute) and a pressure difference across the cooling passages 44 of 8.5 PSID (differential pressure or pressure drop), the inner member 40 was cooled to a temperature of about 1340° F. at the inlet and about 1650° F. at the outlet. This was with about 50 lbm/sec of combustion gases flowing through the inner member 40 at about 2900° F. and about 0.0043 lbm/sec of coolant flowing through each passage 46 (about 0.38 lbm/sec for the entire combustor). The outlet temperature of about 1650° F. was greater than desired, so a redesign of the combustor was undertaken

EXAMPLE 2

A later iteration of the combustor used cooling passages 46 that were about 0.375 inches wide, about 0.040 inches deep and about 4 inches long with the same coolant and combustion gas conditions as Example 1. For the same pressure difference the coolant flow increased to about 0.0090 lbm/sec per passage (about 0.79 lbm/sec for the entire combination) and the metal temperatures dropped to less than about 1400° F. at the outlet, consistent with the long service life requirement of gas turbine components.

EXAMPLE 3

The latest unbonded combustor 18 to be assembled has the same passage dimensions as in Example 2, but is constructed of Nimonic 263 for better high temperature strength. The minimum inner 40 wall thickness was increased to about 0.075 inches and the outer member 42 wall thickness has been reduced to about 0.040 inches. A circumferential cooling passage about 0.375 inches wide and about 0.040 inches deep, located about 0.375 inches downstream of the coolant inlet was machined completely around the circumference of the inner member (See FIG. 7). This combination was tested under combustion conditions and achieved a hot side maximum temperature of about 1380° F., which was consistent with the long service life requirement of gas turbine components.

Figure 5:
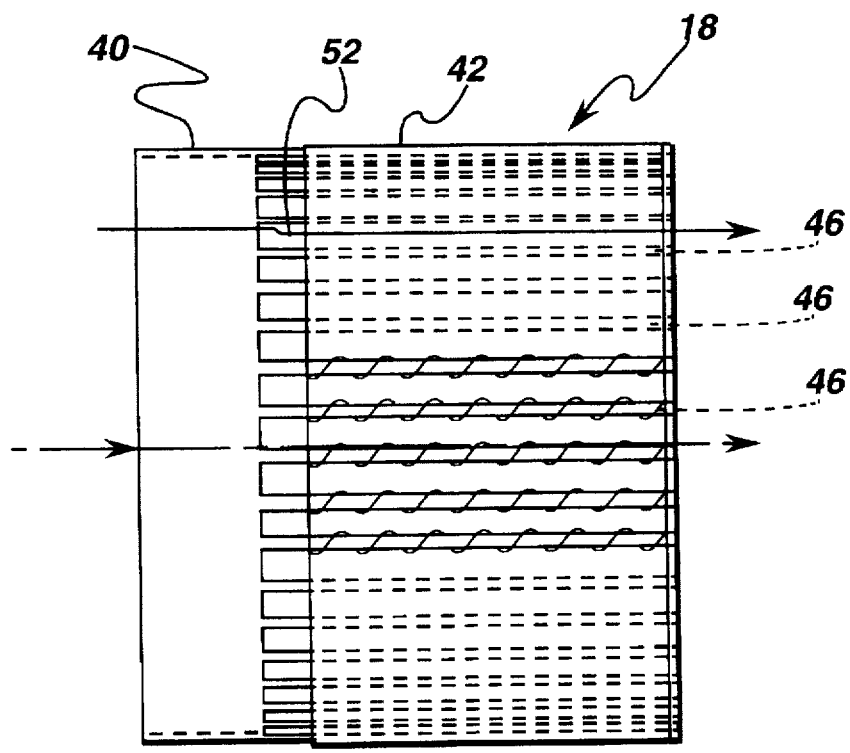
FIG. 5 is a view of the doubled walled structure of FIG. 4 where the outer cylinder is shrink-fitted over the machined inner cylinder, forming the cooling passages and is then joined to the inner cylinder at each rib location by a method such as Electron-beam (E-beam) welding.
Figure 6:
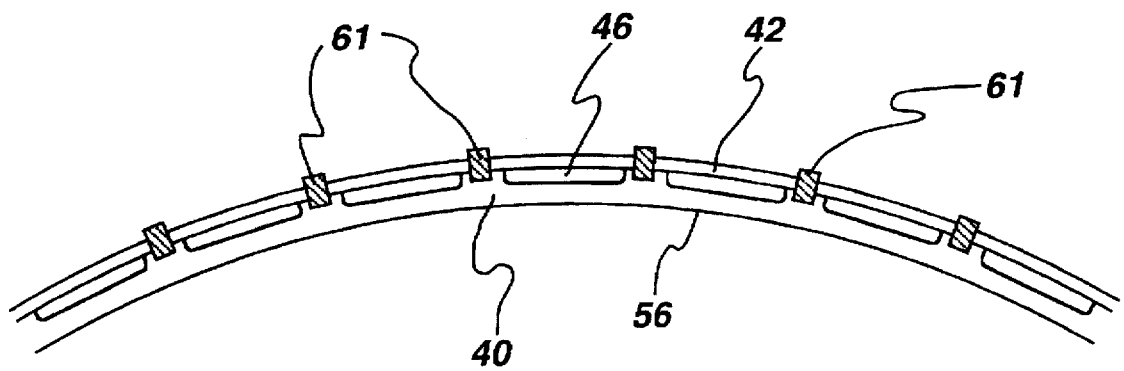
FIG. 6 is a partial cross-section of a double wall structure, showing the passages formed by the machined inner ring and the shrink-fitted and welded outer ring.

As shown in FIGS. 5 and 6, an additional possible construction for combustors and transition pieces which include structures having axial cooling channels can be fabricated using two members 40, 42 shrink-fitted together and then joined, such as, by welding. As above, each member 40, 42 may be produced by the ring-rolling wrought sheet-stock to the desired diameter, and then joining the member at the gap by a welding method, such as Gas Tungsten Arc (GTA) welding or Electron-beam (E-beam) welding, as described above. Also, as above, the outer member 42 is then shrink-fitted onto the inner member 44, forming the cooling passages 46. The outer member is then joined in place using a technique such as laser or E-beam welding. The geometry of this double-walled cooling structure and the location of the welds 61 at each rib are shown in more detail in FIG. 5. As before, since the cooling geometry is not restricted to the simple axial passages shown, more complicated enhanced cooling geometries can be formed on the inner member wall, circumferential cross-flow passages can be included in the forming step, as above.

The outer member 42 in this example is positioned such that the entrance 52 to the cooling passage 46 is exposed to the cooling air, which flows through the passages 46 and cools the hot inner wall 56. During operation of the combustor 18, the hot combustion gases flowing through the inner member 40 will keep it hotter than the outer member 42. This temperature difference will hold the members tightly together without bonding, as discussed above. In some cases, however, the resulting stress in the members 40, 42 can be high enough to plastically deform and distort either the hot wall 56 or the cold wall 58 or both.

The improved thermal contact between the inner 40 and outer 42 member created by the joining operation can significantly reduce the temperature difference between them, which in turn also significantly reduces the thermal stress levels in the members generated by the temperature gradients through the double walled structure as described in Example 4, below.

EXAMPLE 4

A 90 degree section of the double walled Hastelloy-X cylinder was modeled using a Finite Element Analysis for the same combustion gas and coolant conditions. The two extreme cases of no thermal contact and full thermal contact between the two members 40, 42 were modeled. The maximum stress in the full thermal contact case was ⅓ of the maximum stress in the no thermal contact case. The unbonded members 40, 42 will have some thermal contact, of course, and the stress levels will fall somewhere between the two extremes.

One welding technique used was E-beam welding Nimonic 263 test pieces together. The test pieces are flat rather than cylindrical, but have the same passage/rib configuration shown in FIG. 6.

The lower stress levels in a bonded structure will provide for a longer service life for the component, which may justify the added cost of the joining operation.

Figure 7:
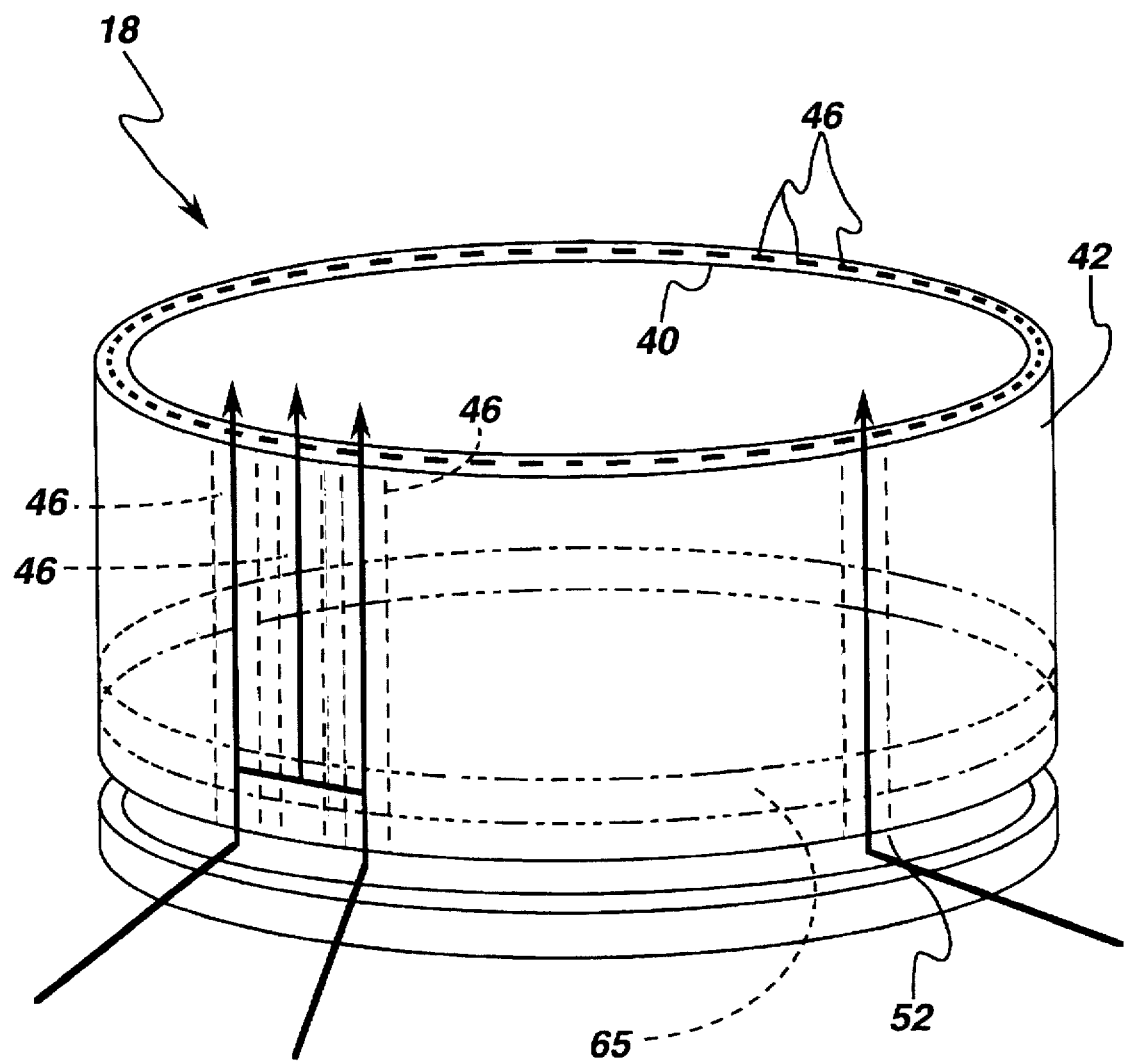
FIG. 7 is a perspective view of one embodiment of a double wall, axially cooled cylindrical structure with circumferential cross-flow passage.

As described above, structures, such as combustors with cooling passages 46 running axially can be protected from inlet blockage by providing a circumferential cross-flow passage 65 located just downstream of the coolant passage inlets 52, as shown in FIG. 7. If all axial passages 46 remain unblocked, there will be no pressure difference across the cross-flow passage 65 and no flow through it. This cross-flow passage 65 can be created in the same manner as the axial flow passages 46.

EXAMPLE 5

Figure 8:
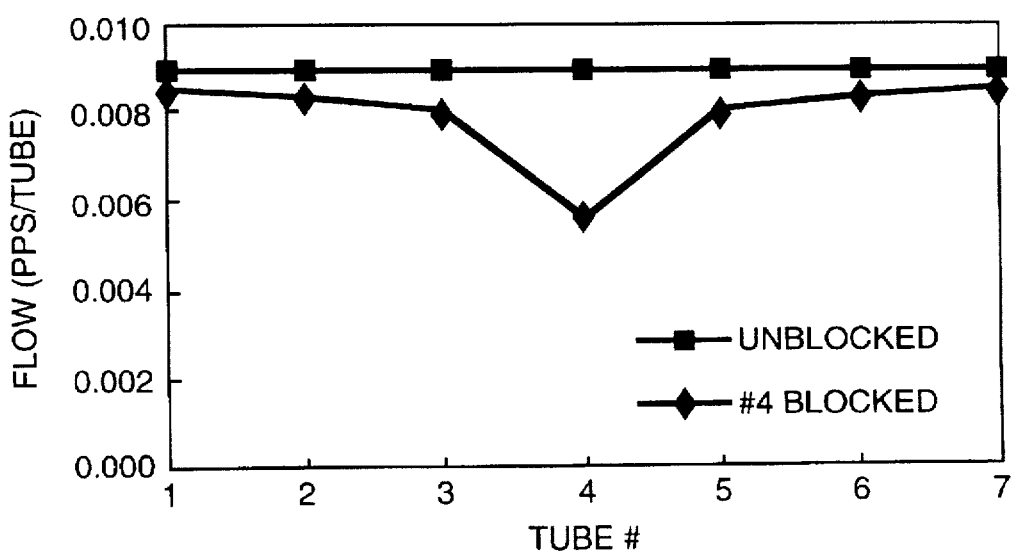
FIG. 8 is a graph representing an example of network flow simulation of seven (7) parallel axial cooling passages showing how cross flow passage maintains 63% of the unblocked flow through cooling passage #4, even with its inlet completely blocked.
Figure 9:
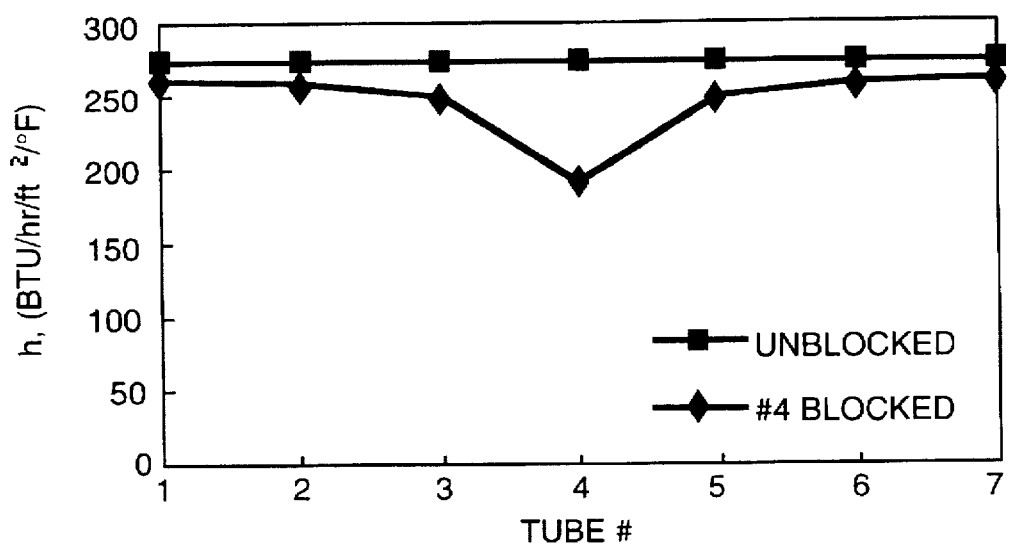
FIG. 9 is a graph representing an example of network flow simulation of seven (7) parallel axial cooling passages showing how cross flow passage maintains the heat transfer coefficient at 70% of the unblocked flow value in cooling passage #4.

A flow circuit simulation was performed on a model of a typical cooling passage 46 geometry. The model has seven (7) parallel axial cooling passages about 0.375 inches, about 0.040 inches high and about four (4") inches long. If the cooling passages are operated under typical gas turbine conditions (coolant temperature about 725° F., coolant pressure about 217 PSIA, pressure drop across the passages about 8.5 PSI, metal temperature about 1400° F.), the simulation shows that the cross flow passage maintains about 63% of the unblocked flow through a cooling passage with one inlet completely blocked, as shown in FIG. 8. FIG. 9 shows that the heat transfer coefficient in the blocked tube is predicted to be about 70% of its unblocked value. These results show that the cooling passages surrounding the blocked passage are largely unaffected by the flow into the blocked passage through the cross-flow passage.

This type of perpendicular cross-flow passage 65 could be applied in any situation where parallel cooling passages 46 are used in double-wall structures and might become blocked. The concept is not restricted to cylindrical combustors, but could be applied to more complex structures such as turbine transition pieces or annular combustors.

While the systems and methods contained herein constitute preferred embodiments of the invention, it is to be understood that the invention is not limited to these precise systems and methods, and that changes may be made therein without departing from the scope of the invention which is defined in the appended claims.

What is claimed is:

1. A hot gas control structure for a turbine comprising:

an inner member having a plurality of grooves formed on an outer surface thereof;

an outer member operatively positioned over the inner member; and a plurality of axial cooling passages operatively positioned between the outer member and the inner member, for providing cooling compressed air to cool an inner surface of the inner member, the plurality of axial cooling passages providing the cooling compressed air in a substantially parallel flow path to the plurality of grooves formed on the outer surface of the inner member.

2. The hot gas control structure of claim 1 wherein the outer member is shrink fitted to the inner member.

3. The hot gas control structure of claim 2 wherein the inner member further comprises:

a plurality of mechanical stops, operatively positioned on the aft end of the inner member, for preventing the outer member from sliding.

4. The hot gas control structure of claim 2 wherein the outer member is joined to the inner member.

5. The hot gas control structure of claim 1 further comprising:

a plurality of circumferential cross-flow passages, operatively positioned downstream from passage inlets, for providing cooling to the axial cooling passages if at least one cooling passage should become blocked.

6. A gas turbine, comprising:

a compressor for producing compressed air;

a combustion structure including an inner member and an outer member in flow communication with the compressor, the combustion structure including a plurality of combustors for producing a hot gas disposed in a combustion chamber and in flow communication with the combustion chamber;

a turbine section in flow communication with the combustors and forming a flow path for the hot gas;

means for cooling the combustion structure including a plurality of axial cooling passages for circulating a portion of the compressed air from the compressor through the combustor structure between the inner member and the outer member in a substantially parallel, linear flow path.

7. The gas turbine of claim 6 wherein the outer member is shrink fitted to the inner member.

8. The gas turbine of claim 7 wherein the inner member further comprises:

a plurality of mechanical stops operatively positioned on the aft end of the inner member, for preventing the outer member from sliding.

9. The gas turbine of claim 7 wherein the outer member is welded to the inner member.

10. The gas turbine of claim 6 further comprising:

a plurality of circumferential cross-flow passages, operatively positioned downstream from passage inlets, for providing cooling to the axial cooling passages if at least one cooling passage of the plurality of axial cooling passages should become blocked.

11. A gas turbine comprising:

a compressor section for producing compressed air;

a combustion section in which the compressed air is heated, the combustion section including a combustor comprising:

an inner member including a plurality of axial slots formed on the outer surface thereof;

an outer member operatively positioned over the inner member, the combined outer and inner members having a plurality of axial cooling passages operatively positioned between the inner and the outer members;

means, operatively connected to the compressor section and the combustion section for providing at least some compressed air from the compressor section to the cooling passages along the plurality of axial cooling passages in a substantially parallel, linear flow path, such that the inner surface of the inner member is cooled; and turbine means, operatively connected to the combustor section, for converting the hot gas from the combustor member into power.

12. The gas turbine of claim 11 wherein the outer member is shrink fitted to the inner member.

13. The gas turbine of claim 12 wherein the inner member further comprises:

a plurality of mechanical stops operatively positioned on the aft end of the inner member, for preventing the outer member from sliding.

14. The gas turbine of claim 12 wherein the outer member is joined to the inner member.

15. The gas turbine of claim 11 further comprising:

a plurality of circumferential cross-flow passages, operatively positioned downstream from passage inlets, for providing cooling to the axial cooling passages if at least one cooling passage should become blocked.

16. A gas turbine comprising:

a rotary compressor;

a rotary turbine mounted for rotation about an axis and coupled to the compressor to drive the same;

a nozzle adjacent the turbine for directing hot gases thereat to rotate the same;

a combustor operatively connected to the turbine, the combustor having an inner and an outer member; and a plurality of axial cooling passages, operatively formed between the inner and outer member, for cooling the inner wall of the inner member, the plurality of axial cooling passages providing the cooling compressed air in a substantially parallel flow path in the plurality of grooves formed on the outer surface of the inner member.

17. The gas turbine of claim 16 wherein the outer member is shrink fitted to the inner member.

18. The gas turbine of claim 17 wherein the inner member further comprises:

a plurality of mechanical stops operatively positioned on the aft end of the inner member, for preventing the outer member from sliding.

19. The gas turbine of claim 17 wherein the outer member is welded to the inner member.

20. The gas turbine of claim 16 further comprising:

a plurality of circumferential cross-flow passages, operatively positioned downstream from passage inlets, for providing cooling to the axial cooling passages if at least one cooling passage of the plurality of axial cooling passages should become blocked.

21. A hot gas control structure for a turbine comprising:

an inner member having a plurality of grooves formed on an outer surface thereof;

an outer member operatively positioned over the inner member; and a plurality of axial cooling passages operatively positioned between the outer member and an inner member, for providing cooling compressed air in a substantially uneven flow path to cool the inner surface of the inner member.

22. A hot gas control structure for a turbine comprising:

an inner member having a plurality of grooves formed on an outer surface thereof;

an outer member operatively positioned over the inner member; and a plurality of axial cooling passages operatively positioned between the outer member an inner member, for providing cooling compressed air in a substantially linear flow path to cool the inner surface of the inner member.

* * * * *